(12) United States Patent
Reilhac

(10) Patent No.: US 9,368,033 B2
(45) Date of Patent: Jun. 14, 2016

(54) UPGRADE SYSTEM FOR A MOTOR VEHICLE, AND METHOD FOR ASSISTING A DRIVER IN DRIVING A MOTOR VEHICLE

(75) Inventor: Patrice Reilhac, Esslingen (DE)

(73) Assignee: VALEO Schalter und Sensoren GmbH, Bietigheim-Bissingen (DE)

( * ) Notice: Subject to any disclaimer, the term of this patent is extended or adjusted under 35 U.S.C. 154(b) by 472 days.

(21) Appl. No.: 13/816,348

(22) PCT Filed: Aug. 10, 2011

(86) PCT No.: PCT/EP2011/063743
§ 371 (c)(1), (2), (4) Date: Feb. 11, 2013

(87) PCT Pub. No.: WO2012/020042
PCT Pub. Date: Feb. 16, 2012

(65) Prior Publication Data
US 2013/0141582 A1     Jun. 6, 2013

(30) Foreign Application Priority Data
Aug. 13, 2010   (DE) .......................... 10 2010 034 262

(51) Int. Cl.
*H04N 7/18* (2006.01)
*G08G 1/16* (2006.01)
*G08G 1/0962* (2006.01)

(52) U.S. Cl.
CPC .............. *G08G 1/16* (2013.01); *G08G 1/09623* (2013.01); *G08G 1/167* (2013.01)

(58) Field of Classification Search
CPC .............. H04N 7/18; H04N 21/26291; H04N 21/4113; H04N 21/4126; H04N 21/4223; H04N 21/4542; H04N 21/814; G06F 7/00
USPC ........ 348/148; 340/901, 438, 815.4, 461, 905
See application file for complete search history.

(56) References Cited

U.S. PATENT DOCUMENTS

| 6,392,218 | B1 * | 5/2002 | Kuehnle ..................... 250/208.1 |
| 7,038,577 | B2 * | 5/2006 | Pawlicki et al. .............. 340/435 |
| 8,258,978 | B2 * | 9/2012 | Greasby ........................ 340/901 |
| 2004/0063472 | A1 * | 4/2004 | Shimizu et al. ............ 455/569.1 |
| 2006/0055565 | A1 | 3/2006 | Kawamata et al. |
| 2008/0059054 | A1 * | 3/2008 | Yamada ........................ 701/200 |

FOREIGN PATENT DOCUMENTS

| DE | 102004008867 A1 | 9/2004 |
| WO | 2010/040403 A1 | 4/2010 |

OTHER PUBLICATIONS

International Search Report from PCT/EP2011/063743 mailed on Nov. 16, 2011 (4 pages).

* cited by examiner

*Primary Examiner* — Trang U Tran
(74) *Attorney, Agent, or Firm* — Osha Liang LLP

(57) ABSTRACT

The field of use of a portable communication appliance (2)—for example a mobile telephone—is intended to be extended for assisting a driver in driving a motor vehicle (1). An upgrade system (10) for a motor vehicle (1) is provided, having a portable communication appliance (2) for providing at least one functionality which assists a driver in driving the motor vehicle (1). The portable communication appliance (2) can use image data from a camera (9) to infer a state of movement of a windscreen wiper (16, 17) on the motor vehicle (1). The portable communication appliance (2) then factors in this state of movement when providing the at least one functionality for driver assistance. An appropriate method is also provided.

12 Claims, 1 Drawing Sheet

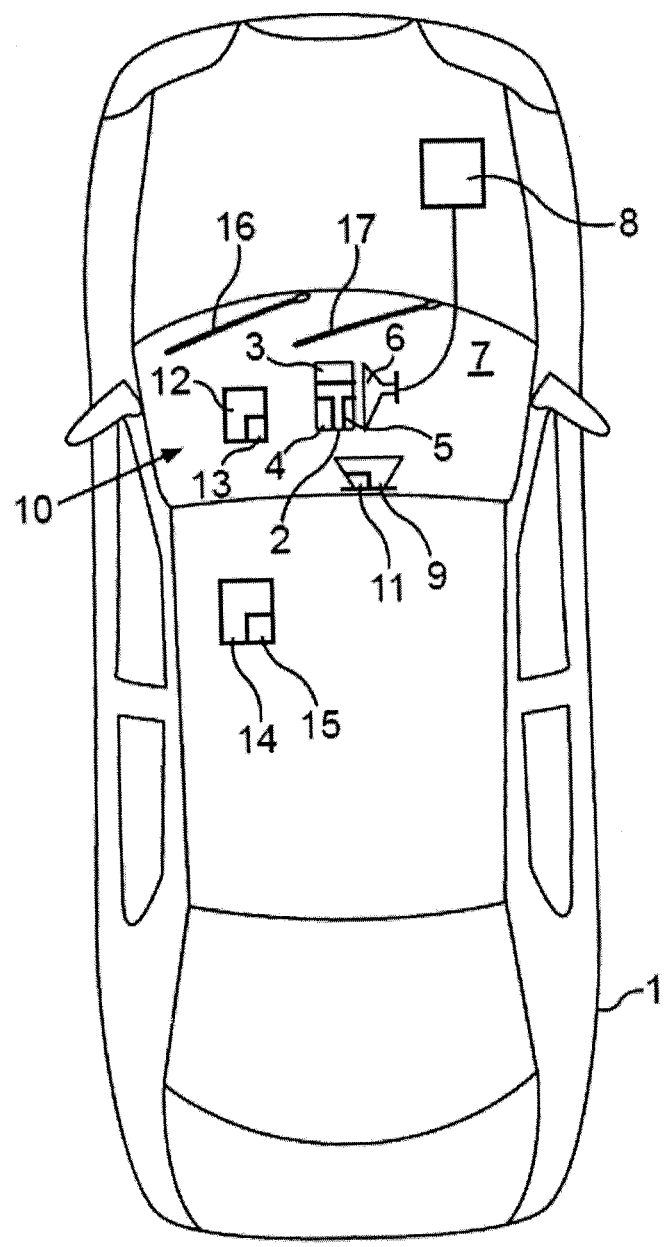

UPGRADE SYSTEM FOR A MOTOR VEHICLE, AND METHOD FOR ASSISTING A DRIVER IN DRIVING A MOTOR VEHICLE

BACKGROUND

The invention relates to an upgrade system for a motor vehicle. The upgrade system comprises a portable communication appliance—for example a mobile telephone—for providing at least one functionality which assists a driver in driving the motor vehicle. Furthermore, the invention relates to a method for assisting a driver of a motor vehicle in driving the motor vehicle by providing at least one functionality using a portable communication appliance.

The present case involves an upgrade system which can be used to upgrade a motor vehicle. Such upgrade systems are already known from the prior art. The core of such an upgrade system is usually a portable communication appliance, to be more precise a digital signal processor of the portable communication appliance. By way of example, the portable communication appliance used may be a mobile telephone (smart phone). It is known that portable communication appliances can be used to assist the driver in driving a motor vehicle. By way of example, it is known that portable communication appliances may have a GPS (Global Positioning System) receiver. In that case, the portable communication appliances have the function of a navigation system and can assist the driver in navigation.

SUMMARY

Thus, the interest in the present case is in such upgrade systems as have no logical connection at all to components that are fixed in the vehicle. Such upgrade systems are completely independent of the vehicle architecture—i.e. independent of any driver assistance systems and/or communication systems which may be present in the vehicle. At most, such upgrade systems are able to be connected to an onboard power supply system, namely for the purpose of supplying power.

In addition to the portable communication appliance, it is also possible to use further upgrade components which can be used to upgrade the motor vehicle. By way of example, these are separate cameras or else separate distance sensors which are able to capture information about surroundings of the motor vehicle and to transmit this information to the portable communication appliance. Such upgrade components are also completely independent of the vehicle architecture and communicate only with the portable communication appliance, namely via a Bluetooth® link, for example. The portable communication appliance then processes the data from the upgrade components and uses these data to provide functionalities which assist the drivers in driving the motor vehicle. By way of example, a functionality in which the driver is warned by the portable communication appliance when leaving a lane is conceivable.

The document DE 10 2004 008 867 A1 discloses an image processing system for a vehicle which is used to process images of surroundings of the motor vehicle or of the interior of the motor vehicle which are obtained by a camera. A miniature computer—e.g. a mobile telephone—undertakes the processing of the image data in this case. A screen on the mobile telephone is used to display images which are based on the image data from the camera. The image processing system, including the mobile telephone and the camera, is part of a driver assistance system incorporated in the vehicle. This means that the driver is assisted in driving the vehicle by the image processing system only when the image processing system interacts with the driver assistance system that is fixed in the vehicle.

It is an object of the invention to demonstrate a way in which the field of use of an upgrade system of the type in question cited at the outset can be extended for assisting a driver in driving a motor vehicle.

The invention achieves this object by means of an upgrade system having the features according to patent claim 1, and also by a method having the features according to patent claim 12. Advantageous embodiments of the invention are the subject matter of the dependent patent claims and the description.

An upgrade system according to the invention for a motor vehicle comprises a portable communication appliance which is designed to provide at least one functionality which assists a driver in driving the motor vehicle. The portable communication appliance can use image data from a camera—particularly only the image data—to infer a state of movement of a windscreen wiper on the motor vehicle and can factor in this state of movement when providing the at least one functionality.

The field of use of the upgrade system is therefore extended in comparison with the prior art by virtue of the portable communication appliance being designed to determine the state of movement of the windscreen wiper on the basis of image data from an optical camera and to factor in this state of movement when assisting the driver. In this way the portable communication appliance is able to infer whether it is raining; it is also possible to ascertain a current intensity of rain on the basis of the state of movement of the windscreen wiper. Advantageously, it is therefore possible to use the information about the intensity of rain to assist the driver in driving the motor vehicle. By way of example, the portable communication appliance can inform the driver about any speed limits provided—depending on the country of residence—on the basis of the rain. The driver can be assisted in driving the motor vehicle by the upgrade system even when the vehicle has no driver assistance system that is fixed in the vehicle. In particular, the upgrade system can also be used to upgrade older vehicles, including those which, on account of their low price, have no driver assistance systems in the factory. All that is required is the portable communication appliance and possibly further upgrade components which assist the driver in driving the vehicle by interacting with one another.

The upgrade system is particularly independent of the vehicle architecture i.e. of any driver assistance systems and/or communication systems which may be present in the vehicle. The upgrade system preferably has no logical connection to components that are fixed in the vehicle. There may merely be an electrical connection to an onboard power supply system in order to supply the upgrade system with electric power from the onboard power supply system. If at least one further upgrade component is also used in addition to the portable communication appliance, the portable communication appliance and the at least one upgrade component can communicate with one another by bypassing any communication buses which are already present in the vehicle—namely preferably directly via respective communication interfaces.

The portable communication appliance may be a mobile telephone or a mobile or portable personal computer (what is known as a PDA, personal digital assistant). Such communication appliances usually have communication interfaces which are suitable for communication, e.g. with a further upgrade component of the upgrade system. Furthermore, mobile telephones, as well as mobile personal computers, are available on the market in many and diverse forms. If the driver already has a mobile telephone, for example, then he merely needs an appropriate piece of software which can then—when it is executed on the portable communication appliance—use the image data to determine the state of movement of the windscreen wiper and assist the driver by factoring in the state of movement. The driver thus merely needs to install a computer program on his mobile telephone. By way of example, it may be possible to provide such a computer program on an internet server. The driver can then download this computer program and install it on his mobile telephone or the portable personal computer.

It is thus possible for the portable communication appliance to use image data from a camera to infer the state of movement of the windscreen wiper. For the camera, two different embodiments are provided in principle:

First, the upgrade system may have a camera which is separate from the portable communication appliance. This camera is then an upgrade component which can be used to upgrade the motor vehicle. Preferably, the separate camera is designed for placement behind a windscreen of the motor vehicle with which the windscreen wiper is in contact. This camera can transmit image data to the portable communication appliance; in that case, the portable communication appliance is designed to receive these image data and to use these image data to determine the state of movement of the windscreen wiper. The use of a separate camera has the advantage that such cameras are able to record images of high quality and high resolution, with the result that the state of movement can be ascertained with a high degree of precision—by way of example, it is also possible to ascertain the frequency of the movement. Furthermore, this embodiment has the advantage that the separate camera is able to capture images from a surrounding area in front of the motor vehicle and to transmit them to the portable communication appliance; in that case, the portable communication appliance can use these images to provide a wide variety of functionalities which assist the driver in driving the motor vehicle. By way of example, it is possible to warn the driver when leaving a lane and/or to warn the driver about the presence of obstacles in front of the motor vehicle. Using images from the camera, the portable communication appliance is also able to identify road signs and to inform the driver about the identified road signs.

In addition or as an alternative, the portable communication appliance may comprise a camera that is integrated therein and that is designed to capture image data. The portable communication appliance can then use the image data from the integrated camera to infer the state of movement of the windscreen wiper. This embodiment in turn has the advantage that, in particular, no external cameras are required for determining the state of movement; the upgrade system does not require any additional cameras for determining the state of movement and just the portable communication appliance suffices.

In principle, the upgrade system may thus have exclusively the portable communication appliance, which both captures the image data and assists the driver in driving the motor vehicle. However, it may be found to be advantageous if, besides the portable communication appliance, additional upgrade components are used which then communicate with the portable communication appliance. This communication can take place via respective communication interfaces, namely a communication interface of the upgrade component and a communication interface of the portable communication appliance. By way of example, one upgrade component may be the cited camera, the image data from which are used to determine the state of movement. Alternatively, further upgrade components may be provided, for example an ultrasound sensor and/or radar appliance and/or a further camera for mounting on a bodywork portion of the motor vehicle and/or a separate display and/or a projector (head-up display) and/or a lamp which can be mounted on the vehicle, particularly a fog lamp and/or an LED daytime running lamp and/or a supplementary headlamp for main beam and/or a vibration actuator for detachable fitting to a driver's seat. All of these upgrade components can, in principle, be divided into two different groups among one another: a first group of upgrade components which capture data about surroundings and transmit these data to the portable communication appliance, and a second group of upgrade components which provide various functionalities for assisting the driver. When an upgrade component from the first group is used, the portable communication appliance itself can use the data from the upgrade component and also factor in the state of movement of the windscreen wiper to provide a functionality for assisting the driver and/or to actuate an upgrade component from the second group to provide such a functionality. If only an upgrade component from the second group is present, the portable communication appliance itself can—for example by using an integrated camera—capture data about the surroundings and actuate an upgrade component from the second group to provide a functionality and/or it just provides such a functionality.

An upgrade component is preferably understood to mean such a component as can be detachably or nondetachably incorporated into the motor vehicle retrospectively, namely in an interior—e.g. using a bracket—or on an exterior surface of the vehicle—for example on a bumper or an exterior mirror. Hence, both detachable and nondetachable fitting of an upgrade component are usefully possible in principle. It thus suffices to fit the at least one upgrade component to the vehicle retrospectively; the upgrade system then does not require a connection to a communication bus which may be present. If necessary, just an electrical connection can be provided by the vehicle for the at least one upgrade component and/or for the portable communication appliance in order to supply the upgrade component and/or the portable communication appliance with electric power from an onboard power supply system in the vehicle. If an upgrade component is a component which is provided for the interior of the vehicle, it is fitted in the interior, preferably using a bracket, in removable form—i.e. the driver can take out the upgrade component at any time, for example by pulling it out or the like, without destroying it. If an upgrade component is fitted on an exterior surface of the vehicle—for example on the bodywork—then it is possible for this upgrade component to be latched in a receiving opening in a bumper, for example using a retainer. Alternatively, the upgrade component can be fitted using an adhesive joint. It is also possible for an upgrade component to be fitted on the exterior surface of the vehicle using latch and/or screw means, or the upgrade component can be mounted on the bodywork using latch and/or screw means, in which case the mounting sites may be arranged on the inside, i.e. in concealed fashion.

If an upgrade component is also used in addition to the portable communication appliance, the communication between the portable communication appliance and the upgrade component can take place by wire in principle. In this case it is possible to provide a shared bracket for the portable communication appliance and the upgrade component, for example, and the wired communication link may be integrated in the bracket. However, it has been found to be particularly advantageous if the respective communication interfaces are designed for wireless data transmission. The upgrade system can then manage without an electrical connection between the portable communication appliance and an upgrade component; the portable communication appliance can be fitted in the interior of the vehicle using a bracket, for example, while the upgrade component can be fitted on an exterior surface of the vehicle.

In particular, the communication interfaces can transmit the data on the basis of a standard from the IEEE 802.11 family (wireless local area network) and/or on the basis of a standard from the IEEE 802.15 family (Bluetooth®). This embodiment makes use of the fact that portable communication appliances usually already have communication interfaces which are suitable for transmitting data on the basis of a standard from the aforementioned families. It is therefore possible to use a commercially customary portable communication appliance for the upgrade system. If the data transmission takes place on the basis of a standard from the aforementioned families, the portable communication appliance may be designed to identify a wireless data link to the upgrade component and, following an identification of a data link, to automatically provide a functionality which assists the driver in driving the vehicle. Likewise, the portable communication appliance may be designed to stop the provision of the functionality when the communication link is interrupted, namely by the upgrade component, for example. Without an input from the driver, it is therefore possible to activate and deactivate the assistance from the driver, namely on the basis of the presence of the wireless communication link between the portable communication appliance and the upgrade component.

The portable communication appliance can use the image data—from the separate camera and/or the integrated camera—to determine the state of movement of the windscreen wiper. In principle, this may involve the portable communication appliance using the image data to establish whether or not the windscreen wiper is moving and hence whether or not it is raining. However, it is found to be particularly advantageous if the portable communication appliance can use the image data to infer a frequency and/or speed of movement of the windscreen wiper. By way of example, this may have the appearance that the portable communication appliance determines the respective instantaneous frequency and/or speed, the absolute value of which may be arbitrary. In addition or as an alternative, the portable communication appliance can use the image data to infer a mode of operation of the windscreen wiper; by way of example, there may be at least three, particularly at least four different modes of operation provided, namely a "windscreen wiper deactivated" mode of operation and/or an "interrupted operation" mode of operation and/or a "slow movement" mode of operation and/or a "fast movement" mode of operation. The portable communication appliance can therefore infer an intensity of rain and factor in the intensity of rain to provide at least one functionality which assists the driver.

By way of example, the determination of the state of movement of the windscreen wiper may have the appearance that the portable communication appliance checks a temporal sequence of images of a windscreen for whether there is an alteration in the images over time. For an activated windscreen wiper, the portable communication appliance identifies a movement by the windscreen wiper in the image, namely first of all upwards and shortly thereafter downwards or vice versa, depending on the embodiment of the windscreen wiper.

As already explained, the upgrade system may have at least one upgrade component that is separate from the portable communication appliance and that can be used to upgrade the motor vehicle. By way of example, such an upgrade component may be a capture device which is used to capture data about a surrounding area for the motor vehicle and to transmit this data to the portable communication appliance. The portable communication appliance can then take these data as a basis, and factor in the state of movement of the windscreen wiper, for providing at least one functionality which assists the driver in driving the vehicle. By way of example, the capture device used may be a camera and/or an ultrasound sensor and/or a radar appliance. In this way, the portable communication appliance can inform the driver about the presence of obstacles, for example. By way of example, the portable communication appliance can warn the driver if a distance between an obstacle and the motor vehicle is below a prescribed threshold which can be set on the basis of the state of movement of the windscreen wiper and hence on the basis of the intensity of rain.

The portable communication appliance can also take the data from the capture device as a basis, and factor in the state of movement of the windscreen wiper, for producing control data and transmit the control data to at least one further upgrade component so as thereby to actuate the at least one further upgrade component to provide a functionality for assisting the driver. By way of example, a lamp can be actuated as an upgrade component on the basis of the state of movement of the windscreen wiper. It is also possible to take the state of movement of the windscreen wiper as a basis for actuating a display as an upgrade component, namely for example such that the road signs identified by the portable communication appliance and/or any speed limits provided on account of the rain are displayed on the display.

In one embodiment, it is thus possible for the portable communication appliance to use the data from the capture device to identify an obstacle that is external to the vehicle. The portable communication appliance can then factor in the state of movement of the windscreen wiper for outputting a piece of information about the identified obstacle. Hence, the driver is informed about the obstacle, namely also by factoring in the state of movement of the windscreen wiper or the intensity of rain. By way of example, this may have the appearance that the portable communication appliance uses the data from the capture device to determine a distance between the obstacle and the motor vehicle and then warns the driver when the distance is below a threshold. The threshold for the distance can be set on the basis of the state of movement of the windscreen wiper. In this way, it is possible to increase safety when driving the motor vehicle; the reason is that the driver can be warned significantly earlier in the case of relatively heavy rain than in the case of light rain or when the road is dry. The driver then has more time to slow down the motor vehicle in order to avoid a collision with the obstacle.

A front camera, which is used to record image data about a surrounding area for the motor vehicle, particularly in front of the motor vehicle, can be used as an upgrade component— and also as a capture device. The front camera may be designed for placement behind the windscreen. It may also be the external camera which records the image data for determining the state of movement of the windscreen wiper. The image data from the front camera can be transmitted to the portable communication appliance. The portable communication appliance can then take the image data from the front camera as a basis, and factor in the state of movement of the windscreen wiper, for providing at least one functionality which assists the driver. By using a front camera it is possible for a wide variety of functionalities for assisting the driver to be provided, namely by the portable communication appliance using the image data from the front camera.

By way of example, the portable communication appliance can use the image data to identify a road sign. This may have the appearance that the portable communication appliance identifies a road sign by subjecting the image data from the front camera to pattern recognition. The portable communication appliance can then output a piece of information about the road sign, namely by factoring in the state of movement of the windscreen wiper. By way of example, the actual road sign can be displayed on a display of the portable communication appliance and/or on a display as an upgrade component. If no rain is identified, this road sign can be displayed without alteration. If rain is detected from the state of movement of the windscreen wiper, on the other hand, it is also possible to display an altered or "distorted" road sign. If a road sign relating to a speed limit in the event of rain is identified, for example, then a lower limit value for the speed than the actually identified limit value can be displayed. This embodiment is based on the fact that in certain countries a lower maximum speed is permitted when it is raining than when the road is dry.

Using the image data from the front camera, the portable communication appliance can also identify an obstacle that is external to the vehicle. The portable communication appliance can then inform the driver about the identified obstacle, namely by factoring in the state of movement of the windscreen wiper. In this case too, the driver can be warned of the presence of the obstacle significantly earlier when it is raining, for example, than when the road is dry, which means that it is possible to increase safety when driving the motor vehicle.

A method according to the invention is designed to assist a driver of a motor vehicle in driving the motor vehicle, namely by providing at least one functionality using a portable communication appliance. Using image data from a camera, the portable communication appliance infers a state of movement of a windscreen wiper on the motor vehicle, and this state of movement is factored in when providing the at least one functionality.

According to the invention a storage medium is furthermore provided which has a stored computer program which—when executed on a portable communication appliance—prompts this communication appliance to use image data from a camera to infer a state of movement of a windscreen wiper and to factor in the state of movement for providing a functionality which assists a driver of a motor vehicle in driving the motor vehicle. The computer program can prompt the portable communication appliance to carry out the method according to the invention.

The preferred embodiments which have been presented with reference to the upgrade system according to the invention, and the advantages of said embodiments, apply accordingly to the method according to invention and to the storage medium according to the invention with the stored computer program.

Further features of the invention arise from the claims, the FIGURE and the description of the FIGURE. All the features and combinations of features which have been cited in the description above and those features and combinations of features which are cited in the description of the FIGURE and/or are shown in the FIGURE alone can be used not only in the respectively indicated combination but also in other combinations or else on their own. The invention will now be explained in more detail using a preferred exemplary embodiment, and also with reference to the appended drawing.

BRIEF DESCRIPTION OF DRAWINGS

The single FIGURE shows a schematic illustration of a motor vehicle having an upgrade system based on an embodiment of the invention.

DETAILED DESCRIPTION

A motor vehicle 1 shown in a schematic illustration in the FIGURE is a car. The motor vehicle 1 is upgraded using an upgrade system 10 which is used to assist a driver in driving the motor vehicle 1. The upgrade system is used to upgrade the motor vehicle 1 retrospectively, i.e. the upgrade system 10 was not yet present in the motor vehicle 1 in the factory.

The upgrade system 10 comprises a portable communication appliance 2, which may be a mobile telephone in the exemplary embodiment. The portable communication appliance 2 has a display 3 as well as a communication interface 4 which is able to send and receive data, namely on the basis of a WLAN communication standard and/or a Bluetooth® communication standard. The portable communication appliance 2 may be a commercially customary mobile telephone, as is available in a wide variety of forms on the market. The portable communication appliance 2 comprises a computation device 5 that is coupled to the communication interface 4 and that is used to process data. The computation device 5 may contain a digital signal processor, for example. The upgrade system 10 comprises a bracket 6 which can be used to mount the portable communication appliance 2 on a windscreen 7 in the interior of the motor vehicle 1. The bracket may have a supply connection which can be used to supply the portable communication appliance 2 with electric power. To this end, the bracket 6, to be more precise the supply connection of the bracket 6, is electrically connected to an onboard power supply 8 of the motor vehicle 1 by means of an electrical line. This electrical connection is detachable, i.e. the bracket 6 can be taken down and removed from the motor vehicle 1. The bracket 6 can be mounted on the windscreen 7 using a suction cup, for example.

Furthermore, the upgrade system 10 comprises a front camera 9 which comprises an appropriate communication interface 11 for wireless data transmission on the basis of a standard from the aforementioned families. The communication interfaces 4, 11 can be used by the portable communication appliance 2 and the front camera 9 to communicate with one another, namely to interchange data. The front camera 9 is placed behind the windscreen 7 in the interior of the motor vehicle 1 directly below a vehicle roof lining and captures an area up to 10 m in front of the motor vehicle 1, for example. The front camera 9 may be a CMOS camera. It captures image data about the area in front of the motor vehicle 1 and transmits the image data to the mobile telephone 2, namely via the respective communication interfaces 4, 11. The front camera 9 can also be placed on a windscreen 7 using a bracket. It is also usefully possible to provide a shared bracket 6 for the portable communication appliance 2 and the front camera 9. In that case, as an alternative to wireless data transmission or in addition thereto, it is also possible for wired data transmission to take place between the portable communication appliance 2 and the front camera 9, namely via an electrical connection integrated in the bracket 6.

Furthermore, the upgrade system 10 may comprise a display device 12, namely particularly a display which is separate from the portable communication appliance 2 and/or an image projector (head-up display). Using an image projector, it is then possible for images with information to be projected onto the windscreen 7. The display device 12 can be fitted detachably in the interior of the motor vehicle 1, namely on a dashboard, for example. If an image projector is used, it is thus possible to use this upgrade component to put important information directly into the field of view of the driver. The display device 12 comprises a communication interface 13 which the display device 12 can use to receive data with information from the portable communication appliance 2. Hence, the portable communication appliance 2 can actuate the display device 12, namely by transmitting data with information which is intended to be displayed by the display device 12.

The upgrade system 10 may also contain a vibration actuator 14. The vibration actuator 14 can be fitted on a driver's seat and/or on a brake pedal retrospectively and detachably. The vibration actuator 14 comprises a communication interface 15 which the vibration actuator 14 can use to receive the control data from the portable communication appliance 2. Hence, the portable communication appliance 2 can actuate the vibration actuator 14 and hence warn the driver of an identified hazard, for example, namely haptically.

The front camera 9, the display device 12 and the vibration actuator 14 are exemplary upgrade components which can be used to upgrade the motor vehicle 1 retrospectively. These upgrade components and also the portable communication appliance 2 have no logical connection to components of the motor vehicle 1 which are fixed in a vehicle and present in the factory. The upgrade system 10 thus works totally independently of any further driver assistance systems present in the motor vehicle 1 and also independently of the vehicle architecture. The upgrade system 10 may possibly also contain further upgrade components, such as lamps, distance sensors and the like, which then also communicate wirelessly with the portable communication appliance 2.

When the portable communication appliance 2 is inserted into the bracket 6, the driver can be assisted in driving the motor vehicle 1. The activation of the assistance can also be made dependent on whether or not a communication link (Bluetooth and/or WLAN) has been set up between one of the upgrade components and the portable communication appliance 2.

The front camera 9 transmits image data to the mobile telephone 2. The front camera 9 also captures at least one area of the windscreen 7, particularly the whole windscreen 7. The front camera 9 may be arranged such that it captures at least that area of the windscreen 7 which is cleaned by a windscreen wiper 16, 17.

The portable communication appliance 2 receives image data from the front camera 9 and can use these image data to establish whether or not the windscreen wipers 16, 17 are in operation. Specifically, the communication appliance 2 can determine a state of movement of the windscreen wipers 16, 17. In principle, this state of movement can be ascertained in binary form, i.e. the communication appliance 2 can merely establish whether or not the windscreen wipers 16, 17 are active. The portable communication appliance 2 can establish this by using a temporal sequence of images from the front camera 9. However, it is found to be particularly advantageous if the portable communication appliance 2 uses the temporal sequence of images also to ascertain a frequency and/or speed of the movement of the windscreen wipers 16, 17. In that case, the portable communication appliance 2 can also infer intensity of the rain.

The information about the state of movement of the windscreen wipers 16, 17 is factored in by the portable communication appliance 2 when assisting the driver in driving the motor vehicle 1. The computation device 5 can take the image data from the front camera 9 as a basis for providing the following functionalities for assisting the driver, for example: the computation device 5 can use the display 3 of the mobile telephone 2 and/or the display device 12 to directly display images which correspond to the images recorded by the camera 9. The computation device 5 can also subject the image data from the front camera 9 to pattern recognition in order to identify a road sign. Following identification of a road sign, the computation device 5 can use the display 3 and/or the display device 12 to display an image which reproduces this identified road sign and/or can output an audible signal that characterizes the identified road sign. On the basis of the image data from the front camera 9, the computation device 5 can also identify carriageway markings. The computation device 5 can then establish when the motor vehicle 1 is about to drive over or has already driven over an identified carriageway marking and can output an audible signal as a warning and/or can transmit control data to the vibration actuator 14. In that case, the driver is warned about possibly driving over the carriageway marking by the vibration actuator 14. Using the image data from the front camera 9, the computation device 5 can also identify obstacles that are situated in front of the motor vehicle 1 and can warn the driver if necessary, namely using the vibration actuator 14 and/or an audible signal and/or an appropriate display on the display 3 and/or the display device 12. The computation device 5 can also use the image data to determine a distance between the obstacle and the motor vehicle 1 and can warn the driver if this distance is below a limit value or a threshold.

The factoring-in of the state of movement of the windscreen wipers 16, 17 when assisting the driver may have the following appearance, for example: in general, the computation device 5 can warn the driver about the presence of obstacles and/or that he is about to drive over or has already driven over a carriageway marking earlier in the event of heavy rain than in the event of light rain or when the road is dry. By way of example, the threshold for the distance between the obstacle and the motor vehicle 1 can be set on the basis of the state of movement of the windscreen wipers 16, 17, particularly on the basis of the frequency and/or speed of the movement. The following relationship may apply: the heavier the rain, the higher the threshold for the distance.

On the basis of the state of movement of the windscreen wipers 16, 17, it is also possible to set at least one property or one parameter of the displayed images, namely for example a degree of brightness for the images.

As already explained, the computation device 5 can also identify road signs using the image data from the front camera 9. If a road sign relating to a speed limit is identified, for example, then this sign can be displayed on the display 3 and/or on the display device 12. If rain is now identified, the portable communication appliance 2 can inform the driver that there may be further speed limits provided on account of the rain. This can be effected on the basis of the location or of the country which the motor vehicle 1 is in, for example. By way of example, the maximum permissible speed on a French motorway is 130 km/h. However, this limit applies only to a dry road. When it is raining, this speed is just 110 km/h. It is precisely about this which the portable communication appliance 2 can inform the driver.

The invention is not limited to the exemplary embodiments shown in the drawing. All the features and combinations of the features which are described in the general part of the description and are shown in the drawing can be combined with one another, which means that embodiments formed in such a way can be deemed to have been disclosed in this regard. In particular, the features and combinations of features which are cited in the general part of the description can be used to generate new exemplary embodiments, namely including ones which are not shown explicitly in the drawing. Features and combinations of features from the exemplary embodiments disclosed with the description of the FIGURE can be combined with features and combinations of features which are disclosed in the general part of the description to form new exemplary embodiments that can be deemed to have been disclosed.

The invention claimed is:

1. An upgrade system for a motor vehicle, comprising a portable communication appliance for providing at least one functionality which assists a driver in driving the motor vehicle, wherein:
the portable communication appliance uses image data from a capture device to infer a state of movement of a windscreen wiper on the motor vehicle and factors in this state of movement when providing the at least one functionality,
the upgrade system comprising:
the capture device which is separate from the portable communication appliance and which comprises a communication interface for wireless data transmission as an upgrade component for placement behind a windscreen, wherein the communication interface is used to upgrade the motor vehicle and to transmit image data wirelessly to the portable communication appliance, and wherein the capture device captures data about a surrounding area for the motor vehicle, and transmits the data to the portable communication appliance, wherein the portable communication appliance takes the data as a basis, and to factor in the state of movement of the windscreen wiper, for providing the at least one functionality which assists the driver in driving the vehicle.

2. The upgrade system according to claim 1, wherein the portable communication appliance is a mobile telephone or a mobile personal computer.

3. The upgrade system according to claim 1, wherein the portable communication appliance further comprises a camera integrated therein for the purpose of capturing image data and uses the image data from the integrated camera to infer the state of movement of the windscreen wiper.

4. The upgrade system according to claim 1, wherein the portable communication appliance uses the image data to infer a frequency and/or a speed of movement of the windscreen wiper.

5. The upgrade system according to claim 1, wherein the portable communication appliance takes the data from the capture device as a basis, and to factor in the state of movement of the windscreen wiper, for producing control data, for transmitting the control data to at least one further upgrade component, and thereby for actuating the at least one further upgrade component.

6. The upgrade system according to claim 5, wherein the portable communication appliance uses the data from the capture device to identify an obstacle that is external to the vehicle and to factor in the state of movement of the windscreen wiper to output a piece of information about the identified obstacle.

7. The upgrade system according to claim 6, wherein the portable communication appliance uses the data from the capture device to determine a distance between the obstacle and the motor vehicle and to warn the driver when the distance is below a threshold.

8. The upgrade system according to claim 7, wherein the portable communication appliance sets the threshold for the distance on the basis of the state of movement of the windscreen wiper.

9. The upgrade system according to claim 1, further comprising:
a front camera as an upgrade component for recording image data about a surrounding area for the motor vehicle for placement behind a windscreen of the motor vehicle, wherein the image data is transmitted to the portable communication appliance, and the portable communication appliance takes the image data from the front camera as a basis, and to factor in the state of movement of the windscreen wiper, for providing at least one functionality which assists the driver in driving the vehicle.

10. The upgrade system according to claim 9, wherein the portable communication appliance identifies a road sign by subjecting the image data from the front camera to pattern recognition and to factor in the state of movement of the windscreen wiper to output a piece of information about the road sign.

11. The upgrade system according to claim 9, wherein the portable communication appliance takes the image data as a basis for identifying an obstacle that is external to the vehicle and to factor in the state of movement of the windscreen wiper to inform the driver about the identified obstacle.

12. A method for assisting a driver of a motor vehicle in driving the motor vehicle, comprising:
providing at least one functionality using a portable communication appliance, wherein image data from a capture device are used by the portable communication appliance to infer a state of movement of a windscreen wiper of the motor vehicle, and this state of movement is factored in when providing the at least one functionality, and wherein the capture device is an upgrade component, used to upgrade the motor vehicle, to capture data about a surrounding area for the motor vehicle, and to transmit the data to the portable communication appliance, wherein the portable communication appliance takes the data as a basis, and to factor in the state of movement of the windscreen wiper, for providing the at least one functionality which assists the driver in driving the vehicle.

* * * * *